(12) United States Patent
Blydenburg

(10) Patent No.: X203
(45) Date of Patent: Mar. 22, 1798

(54) CANDLE,DIPPING/CANDLE MACH

(76) Inventor: Samuel Blydenburg

The Schedule referred to in these Letters-Patent and making part of the same, containing a description in the words of the said Samuel Blydenburg himself of an improvement, To-Wit: a machine for Dipping Candles.

Specification of a machine for Dipping Candles invented by Samuel Blydenburg of Hartford in the State of Connecticut. This machine consists of an oblong square about four feet high and of such a length as may suit the extent of the manufactory, the width to be of the length of the candle rods, and is composed of three moveable frames, one of which is for the express purpose of dipping the Candles, which when filled with the rods and the wicks is lowered down by means of a lever, upon one end of which it is suspended, upon the other is hung a weight which by removing occasionally to the end, always keeps the frame in equipoise, as soon as the candles are dipped the frame is raised, and this first is removed by a second which by means of a rack operating for that purpose is placed in its stead and takes its dip also - these propel each other along a slide the whole extent of the machine where, by a similar contrivance the frame or square holding the candles are placed into a frame which raises it to an upper slide drove on by a rack as before, which makes a stroke as the other retires, the frames containing the candles are by regular and like progression pushed forward till the first dipped arrive at the end, where the operation begun; it is introduced into the first frame which rises duly to receive it and at the next motion sinks it level to the dipping frame into which the lever drives it as before related where it now takes a second dip. The nature and structure of this machine is as truly simple as to require but little explanation.

Witnesses present at signing ) Samuel Blydenburg
Hilary Baker )-
Geo. S. Moore )

Copied from the original March 28, 1911, the original being borrowed from the owner by Mr. W. F. Woolard, Chief Clerk, United States Patent Office.

The Schedule refered to in these Letters Patent and making part of the same, containing a description in the words of the said Samuel Blydenburg himself of an improvement [illegible] a machine for Dipping Candles.

Specification of a machine for Dipping Candles invented by Samuel Blydenburg of Hartford in the State of Connecticut. This machine consists of an oblong square about four feet high and of such a length as may suit the extent of the manufactory, the width to be of the length of the [illegible] rods, and is composed of three moveable frames, one of which is for the express purpose of [illegible] the Candles, which when filled with the rods and the wicks is lowered down by [illegible] a lever, upon one end of which it is suspended, upon the other is hung a weight which [illegible] removing occasionally to the end, always keeps the frame [illegible] equipoise, as soon as the [illegible] are dipped the frame is raised and this first is removed by a second which by [illegible] of a rack operating for that purpose is placed in its stead and takes its dip also. these [illegible] each other along a slide the whole extent of the machine where, by a similar contrivance the frame or square holding the candles are placed into a frame which raises it to an upper slide driven on by a rack as before, which makes a stroke as the other retires, the frames [illegible] the candles are by regular and [illegible] progression pushed toward till the first dipped arrive [illegible] the end. where the operation began, & [illegible] introduced into the first frame which rises duly to [illegible] [illegible] the [illegible] [illegible] level to the dipping frame into which the lever [illegible] [illegible] The [illegible] and structure of this machine is [illegible] simple as to require [illegible] explanation.

Witnesses present at signing.

Hilary Baker

Geo. S. Moore

Samuel Blydenburg

ARCHIVES OF THE

Photographic copy made from the original March 28, 1911.